(12) United States Patent
Van Camp et al.

(10) Patent No.: US 10,167,798 B1
(45) Date of Patent: Jan. 1, 2019

(54) METHOD AND SYSTEM FOR CONTROLLING ACCELERATION OF A MARINE VESSEL

(71) Applicant: Brunswick Corporation, Lake Forest, IL (US)

(72) Inventors: Steven L. Van Camp, Cascade, WI (US); Mark W. Henker, Fond du Lac, WI (US); Yana V. Foltice, Campbellsport, WI (US)

(73) Assignee: Brunswick Corporation, Mettawa, IL (US)

( * ) Notice: Subject to any disclaimer, the term of this patent is extended or adjusted under 35 U.S.C. 154(b) by 154 days.

(21) Appl. No.: 15/294,073

(22) Filed: Oct. 14, 2016

(51) Int. Cl.
| *F02D 41/10* | (2006.01) |
|---|---|
| *B63H 21/22* | (2006.01) |
| *F02D 41/26* | (2006.01) |
| *F02B 61/04* | (2006.01) |
| *G06F 3/0488* | (2013.01) |
| *G06T 11/20* | (2006.01) |
| *G06F 3/0484* | (2013.01) |

(52) U.S. Cl.
CPC ............. *F02D 41/10* (2013.01); *B63H 21/22* (2013.01); *F02B 61/045* (2013.01); *F02D 41/26* (2013.01); *G06F 3/04883* (2013.01); *G06F 3/04847* (2013.01); *G06T 11/206* (2013.01)

(58) Field of Classification Search
None
See application file for complete search history.

(56) References Cited

U.S. PATENT DOCUMENTS

| 5,110,310 | A | 5/1992 | Hobbs | |
|---|---|---|---|---|
| 6,109,986 | A | 8/2000 | Gaynor et al. | |
| 6,273,771 | B1 | 8/2001 | Buckley et al. | |
| 7,214,110 | B1* | 5/2007 | Ehlers | B63H 21/14 440/1 |
| 7,361,067 | B1 | 4/2008 | Smedema | |
| 9,145,839 | B1* | 9/2015 | Andrasko | F02D 41/10 |
| 9,233,744 | B2 | 1/2016 | Clever et al. | |
| 2012/0191277 | A1* | 7/2012 | Clever | B63H 21/21 701/21 |
| 2018/0057133 | A1* | 3/2018 | Andrasko | B63H 21/21 |

* cited by examiner

*Primary Examiner* — David P. Merlino
(74) *Attorney, Agent, or Firm* — Andrus Intellectual Property Law LLP (57) ABSTRACT

A method for controlling acceleration of a marine vessel having at least one engine includes receiving a ramp value and an overshoot value, and then determining an acceleration curve based on the ramp value and the overshoot value, wherein the acceleration curve visually represents engine RPM values or vessel speed values over time for accelerating a marine vessel from idle to a desired cruising speed. A graph is then displayed containing the acceleration illustration curve on a user interface display, wherein the graph visually correlates the ramp value and the overshoot value to the acceleration illustration curve. A user input is then received adjusting the ramp value and/or the overshoot value, and the acceleration illustration curve is then redetermined based on the adjusted ramp value and the adjusted overshoot value, and the graph is updated to reflect the new acceleration illustration curve.

20 Claims, 7 Drawing Sheets

METHOD AND SYSTEM FOR CONTROLLING ACCELERATION OF A MARINE VESSEL

FIELD

The present invention generally relates to the control of an engine on a marine vessel and, more particularly, to controlling acceleration during launch of a marine vessel from idle to a cruising speed in a way that is optimal for tow sports, such as launching a water skier.

BACKGROUND

Those skilled in the art of marine propulsion systems, particularly in relation to water ski applications, are familiar with various techniques and procedures used to facilitate the initiation, or launch, for water skiing or other tow sports. In situations where the acceleration pattern of the marine vessel is important in facilitating the launch procedure, it is significantly beneficial if a preferred acceleration path over a pre-selected period of time, or launch profile, is stored and executed by a control system of the marine vessel, and is repeatable upon demand to consistently accelerate the marine vessel in a desired manner. Systems and methods are available in the art for creating, storing, and executing such launch profiles.

The following U.S. patents provide background information and are hereby expressly incorporated by reference in their entireties.

U.S. Pat. No. 9,233,744 discloses a system having a profile storage module, a profile playback module, and a speed control module. The profile storage module stores an acceleration profile specifying a manner of accelerating a marine vessel. The profile playback module, in response to a play command received from a vessel operator, retrieves the acceleration profile and adjusts a desired engine speed based on the acceleration profile. The speed control module controls an engine speed of the marine vessel based on the desired engine speed.

U.S. Pat. No. 7,361,067 discloses a system is provided which stores data relating to the operation of a marine vessel during a water skier launch procedure. The data can include a plurality of throttle handle positions that are stored at a frequency that is suitable for reproducing the movement profile of the handle during a launch procedure. The water skier launch profile is then stored so that it can be recalled and reactivated to repeat the acceleration profile of the boat.

U.S. Pat. No. 7,214,110 discloses an acceleration control system that allows the operator of a marine vessel to select an acceleration profile to control the engine speed of a marine vessel from an initial starting speed to a final desired speed. When used in conjunction with tow sports, such as wake boarding and water skiing, the use of acceleration profile provides consistent performance during the period of time when a water skier is accelerated from a stationary position to a full speed condition.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 6,109,986 discloses an idle speed control system for a marine propulsion system that controls the amount of fuel injected into the combustion chamber of an engine cylinder as a function of the error between a selected target speed and an actual speed. The speed can be engine speed measured in revolutions per minute or, alternatively, it can be boat speed measured in nautical miles per hour or kilometers per hour. By comparing target speed to actual speed, the control system selects an appropriate pulse with length for the injection of fuel into the combustion chamber and regulates the speed by increasing or decreasing the pulse width.

U.S. Pat. No. 5,110,310 discloses an improved apparatus for accurately maintaining the speed of a motorboat at a value set by an operator. Speed of the boat, and force on the boat due to a water skier are measured. Actual speed is compared to a desired speed set by the operator, and speed of the boat engine adjusted to minimize the difference between the desired speed and the actual speed. Engine speed is further adjusted to prevent or minimize changes in the speed of the boat caused by the forces on the boat due to a water skier. The device further incorporates features to reduce the likelihood of speed measurement errors due to a malfunctioning speed measuring device.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a method for controlling acceleration of a marine vessel having at least one engine includes receiving a ramp value and an overshoot value, and then determining an acceleration curve based on the ramp value and the overshoot value, wherein the acceleration curve visually represents engine RPM values or vessel speed values over time for accelerating a marine vessel from idle to a desired cruising speed. A graph is then displayed containing the acceleration illustration curve on a user interface display, wherein the graph visually correlates the ramp value and the overshoot value to the acceleration illustration curve. A user input is then received adjusting the ramp value and/or the overshoot value, and the acceleration illustration curve is then redetermined based on the adjusted ramp value and the adjusted overshoot value, and the graph is updated to reflect the new acceleration illustration curve.

One embodiment of a system for controlling acceleration of a marine vessel having at least one engine includes a processor, a user interface display operatively connected to the processor, and a launch profile interface module executable on the processor. The launch profile interface module is executable to determine an acceleration illustration curve based on a ramp value and an overshoot value, wherein the acceleration illustration curve visually represents engine RPM values or vessel speed values over time for accelerating the marine vessel from idle to a desired cruising speed. The launch profile interface module is further executable to display a graph containing the acceleration illustration curve on a user interface display, wherein the graph correlates the ramp value and the overshoot value to the acceleration illustration curve. The launch profile interface module is further executable to receive input to adjust the ramp value and/or the overshoot value, determine an adjusted ramp value and/or an adjusted overshoot value based on the user input, and redetermine the acceleration illustration curve based on the adjusted ramp value and/or the adjusted overshoot value. The launch profile interface module then updates the graph to reflect the redetermined acceleration illustration curve.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
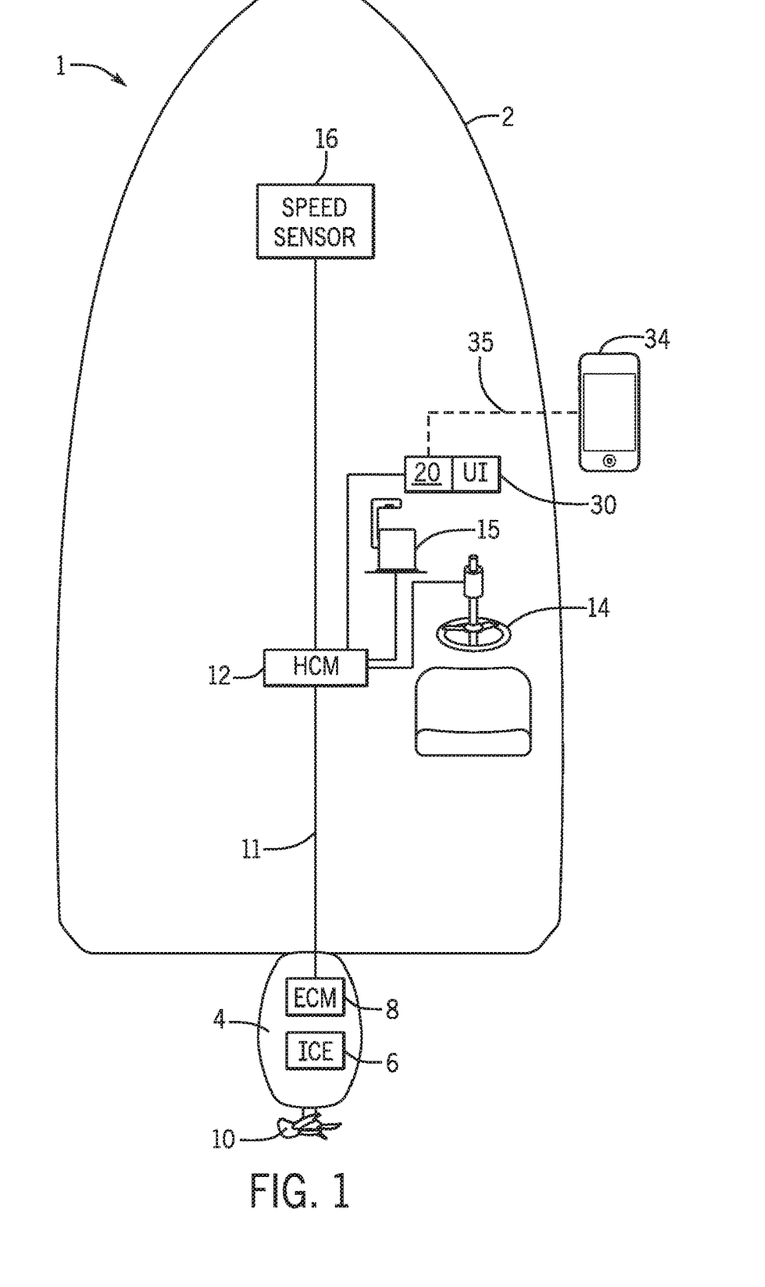
FIG. 1 is a schematic representation of one embodiment of a system for controlling acceleration of a marine vessel.

FIG. 1 schematically represents one embodiment of a system 1 for controlling acceleration of a marine vessel 2. The marine vessel 2 may be any type of watercraft, such as a boat or a jet ski. The marine vessel 2 is equipped with a propulsion device 4 having an engine 6, which in the depicted embodiment is an outboard motor comprising an internal combustion engine. In other embodiments, the marine vessel 2 may be equipped with multiple propulsion devices 4, each having an engine 6. In the example shown and described, the propulsion device 4 is an outboard motor; however, the concepts of the present disclosure are not limited for use with outboard motors and can be implemented with other types of propulsion devices appropriate for marine applications, such as inboard motors, inboard/outboard motors, hybrid electric marine propulsion systems, pod drives, and/or the like. As will be understood by a person having skill in the art in view of the present disclosure, the engine 6 drives rotation of a propulsor 10, such as a propeller, impeller, or combination thereof. Specifically, the engine 6 causes rotation of a driveshaft to thereby cause rotation of a propulsor shaft connected to the propulsor 10, thereby creating thrust (which may be in the forward direction or the reverse direction) to propel the marine vessel 2 through water. An engine control module (ECM) 8 controls the propulsion device 4, including controlling the speed of the engine 6 to control propulsion of the marine vessel 2, including to control acceleration of the marine vessel 2 in the water. As is conventional, the ECM 120 controls the speed of the engine 6 by adjusting the position of a throttle valve, the timing and/or pulse width of a fuel injector, and the timing of a spark. A crankshaft position sensor outputs a crankshaft position signal based on rotation of the crankshaft, which is used by the ECM 8 to determine a rotational speed of the engine in revolutions per minute (RPM), which is referred to herein as engine RPM.

Steering and velocity of the marine vessel 2 are controlled by user input devices, which are exemplified in the depicted embodiment as steering wheel 14 and remote control 15, which are conventional devices for providing user control of the propulsion of the marine vessel 2. For example, the remote control 15 may include a lever operable by a user to control both the gear position of the propulsion device 4—i.e., to select between a forward gear where the propulsion device creates a forward thrust, a reverse gear where the propulsion device creates a reverse thrust, and a neutral position where the propulsion device does not create any thrust. As is conventional, the handle may also control throttle in the reverse and forward gears, to control the fueling of the engine 6 and/or the engine RPM in order to control the velocity and acceleration of the marine vessel 2. As is also conventional, the steering wheel 14 controls a rotational position of the propulsion device 4 in order to control the direction of thrust on the marine vessel 2.

The speed of the marine vessel 2 is measured by speed sensor 16. The speed sensor 16 produces a signal representative of vessel speed (e.g., in miles per hour and/or in kilometers per hour). The speed sensor 16 may be any device capable of measuring vessel speed, which may be with respect to the water or with respect to a fixed land point. For example, the speed sensor 16 may be a paddle wheel sensor, a pressure sensor (such as a pitot tube), or an ion sensor mounted on an outside surface of the marine vessel 2, such as to the bottom of the hull. Alternatively, the vessel speed sensor 16 may be a global positioning system (GPS) mounted at some location on the marine vessel 2 and configured to determine vessel speed based on the change in measured position of the marine vessel 2 over time. Alternatively or additionally, vessel speed may be determined, or approximated, based on engine RPM.

The signal from the speed sensor 16 is received by the HCM 12, which may utilize the vessel speed measurement for various control purposes, including those described herein. Further, the measured vessel speed may be displayed to the user, such as on user interface display 30. In the depicted embodiment, the HCM 12 transmits the measured vessel speed to the computing system 20, which then controls the user interface display 30, however other control and user interface arrangements are within the scope of the disclosure and are known in the relevant art.

In the depicted embodiment, control signals from the steering wheel 14 and remote control 15 are received at a helm control module (HCM) 12, which then transmits control signals to the ECM 8 and/or other devices associated with the propulsion device 4 (such as one or more steering actuators) to effectuate the user's instruction. The HCM 12 and the ECM 8 exchange and communicate control signals via communication link 11, which may be by any wired or wireless means. For example, communication link 11 may be a CAN BUS. Likewise, transmission between the HCM 12 and various other devices on the marine vessel, including the speed sensor 16, computing system 20, steering wheel 14, and remote control 15, may be by any wired or wireless means, which could also be on the CAN BUS.

While velocity and acceleration of the marine vessel 2 may ordinarily be controlled by the user, such as via the remote control 15, in certain situations it is preferable to provide automated acceleration and velocity maintenance control, such as in tow sport applications such as water skiing, wakeboarding, tubing, or the like. In the tow sports, a high degree of precision and consistency in acceleration and velocity control is often required or desirable. Automated acceleration control systems are generally known to those skilled in the art for providing automated acceleration control of a marine vessel, examples of which are disclosed and discussed in the references incorporated herein. Likewise, automated velocity control systems, such as cruise control systems, for maintaining a marine vessel at a selected velocity are also generally known to those skilled in the art, examples of which are also discussed and disclosed in references incorporated herein. Further, various systems and methods are available for recording, storing, and/or executing a launch profile, which is a stored dataset specifying a manner or pattern of accelerating the marine vessel over time, such as dictating engine RPM or vessel speed with respect to time. Multiple launch profiles may be stored in memory in a way that is accessible with and executable by a control module, such as the HCM 12 and/or ECM 8, to execute a consistent and desired launch. A user may select a desired profile from the multiple stored profiles, such as via the user interface display 30, and may then instruct when the launch profile is executed. Alternatively or additionally, the user may create a new launch profile, such as by recording throttle handle positions, engine speeds, and/or vessel speeds during a launch, which can then be stored in memory and replayed. Alternatively or additionally, the launch profile may be downloaded from an external device to a memory location accessible by the HCM 12 and/or ECM 8, such as profiles supplied by a vendor, for example.

Through research, experimentation, and experience in the relevant field, the present inventors recognize that it would be beneficial to enable a user to create a launch profile without having to go through the exercise of actually accelerating the marine vessel 2, such as via the remote control 15, and recording the process. Further, the inventors recognized that such a method of creating launch profiles by executing and recording an actual acceleration process is not ideal because it is cumbersome and does not allow the user an opportunity to revise the profile without going through the motions again of accelerating the marine vessel and recording the process.

Figure 3:
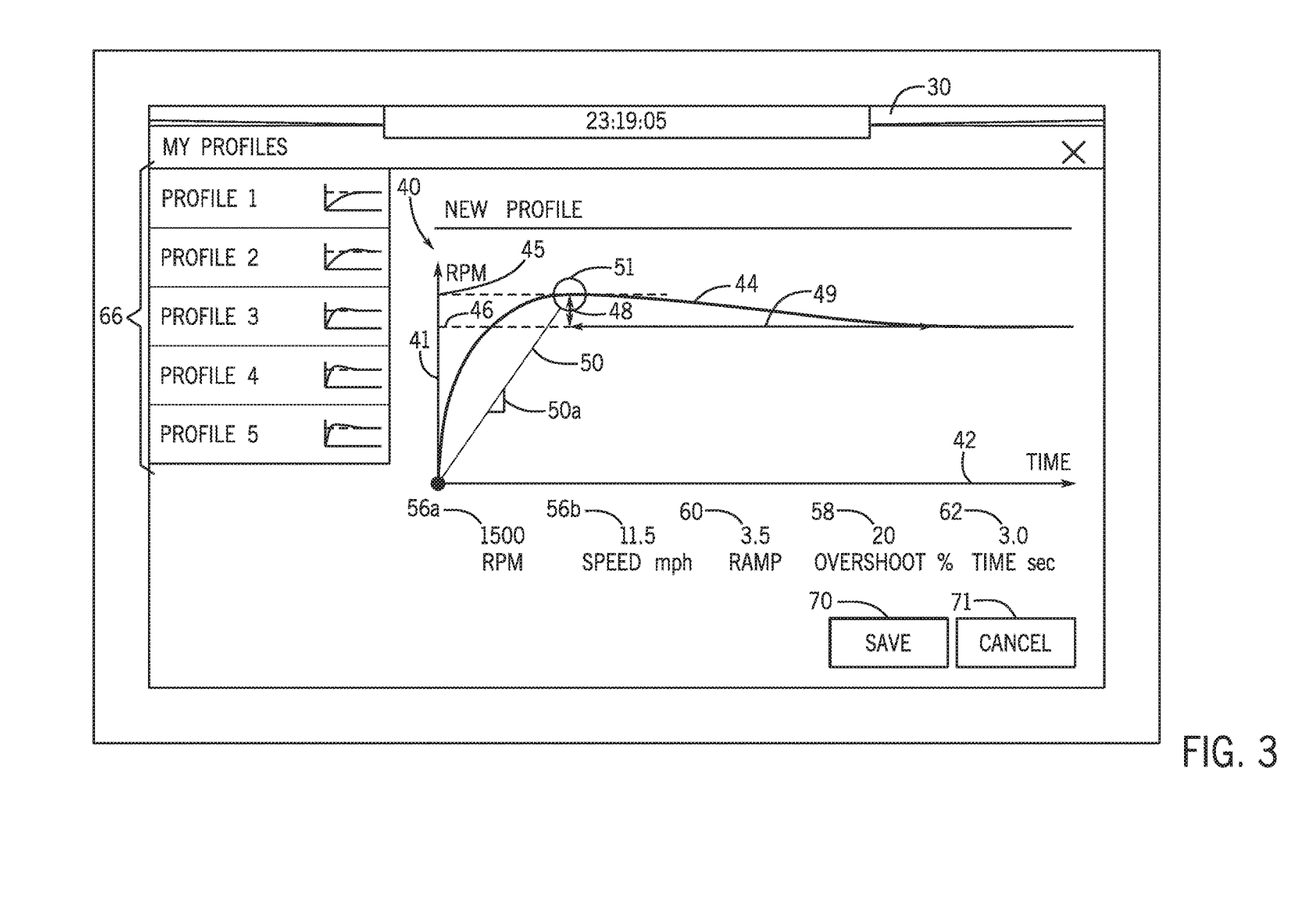
FIG. 3 depicts one embodiment of a graph on a user interface display in accordance with the present disclosure.
Figure 4:
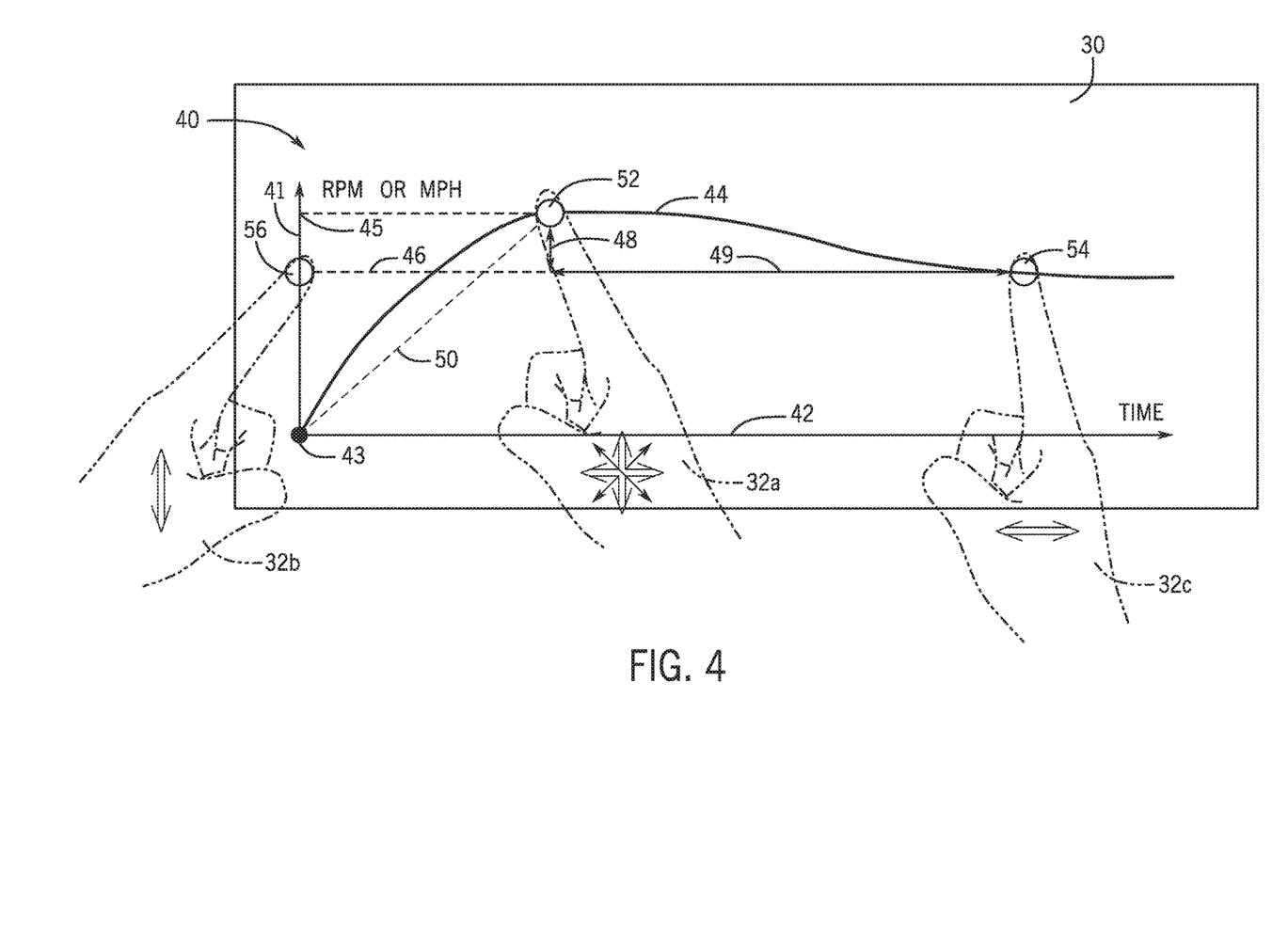
FIG. 4 depicts another embodiment of the graph on a touchscreen user interface display.
Figure 5:
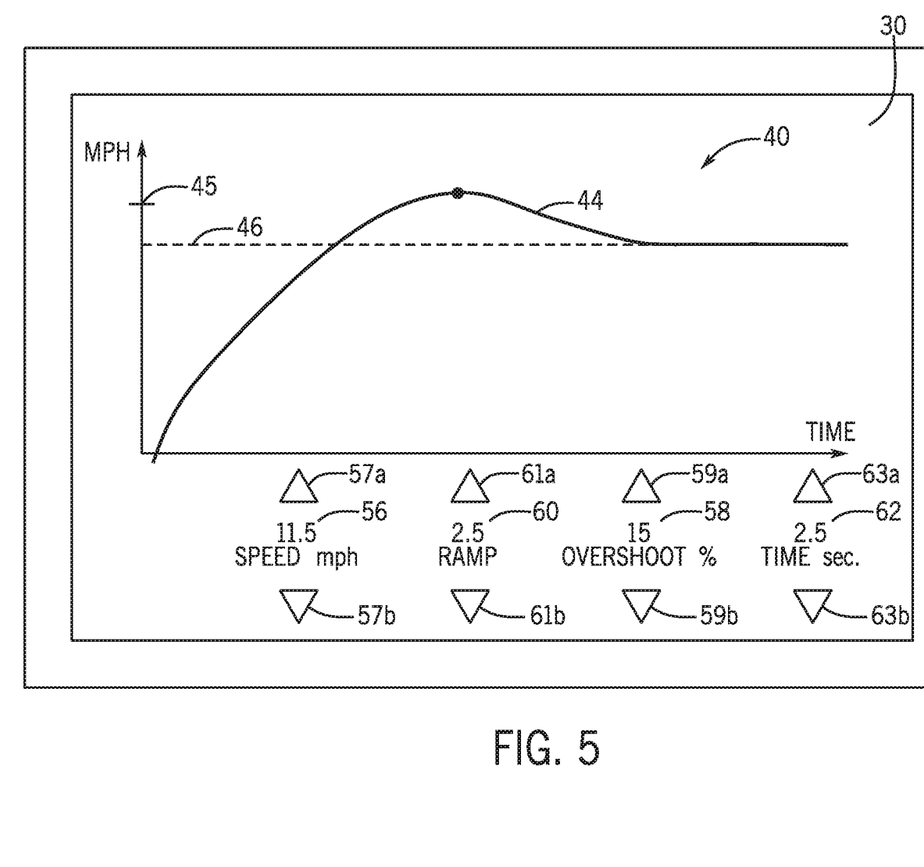
FIG. 5 depicts another embodiment of the graph on a touchscreen user interface display.

In view of the foregoing problems and shortcomings recognized by the inventors, they developed the presently disclosed systems and methods including a user interface providing an efficient and intuitive means for a user to create and save launch profiles without having to go through the exercise of actually accelerating the marine vessel 2. FIGS. 3-5 exemplify a user interface display 30 having a graph 40 containing an acceleration illustration curve 44. The acceleration illustration curve 44 visually represents an approximation of how a real world marine vessel, such as a marine vessel typically used in tow sporting applications, may accelerate from the zero point (e.g., idle) to an overshoot value 58 and then to a desired cruising speed 56. The user interface display 30 is part of a user interface system that allows a user to set one or more of a ramp value 60, an overshoot value 58, a desired cruising speed 56 (which may be an engine RPM value 56a or a vessel speed 56b), and an overshoot hold time 62. One or more of a desired cruising speed 56, ramp value 60, overshoot value 58, and overshoot hold time 62 may be inputted by a user by various methods depending on the configuration of the user interface system, examples of which are described in more detail below. The graph 40 provides a visual correlation between at least the ramp value 60 and the overshoot value 58 and the acceleration illustration curve 44, and adapts as the values are changed by the user in order to provide a visual representation of how each value change impacts the acceleration pattern of the marine vessel 2.

As depicted in FIGS. 3-5, the graph 40 may contain an acceleration illustration curve 44 illustrating vessel acceleration behavior as engine RPM values or vessel speed values over time. In the depicted embodiments, the vertical axis 41 of the graph 40 indicates speed values, either RPM values if speed is controlled according to engine RPM or miles per hour (MPH) values if speed is controlled according to vessel speed. The horizontal axis 42 of the graph 40 depicts time. The acceleration illustration curve 44 depicts speed, either engine RPM or vessel speed, over time as the vessel accelerates from a zero point 43, representing zero RPM or idle, and eventually settles at the cruising speed 56. In the depicted embodiments of the graph 40, the desired cruising speed 56 is represented as horizontal line 46.

The desired cruising speed 56 is the speed setpoint at which the marine vessel will settle and which will be automatically maintained by the system 1 as the marine vessel 2 tows the sporter (e.g., the skier or tuber). The ramp value 60 represents the slope of the acceleration, such as the average acceleration between the zero point 43 and a peak speed 45. The overshoot value 58 is an amount over the desired cruising speed 56. In the depicted examples, the overshoot value 58 is represented as a percentage over the desired cruising speed 56. In other embodiments, overshoot may be represented as a fractional value of the cruising speed or as an absolute value that is added to the desired cruising speed 56.

The inventors have recognized that it is desirable for a user to be able to control the vessel overshoot behavior, which allows control over how the marine vessel gets on plane and settles on the desired cruising speed 56. For example, in a situation where the ramp value 60 is very aggressive and the marine vessel accelerates quickly from idle to the desired cruising speed 56, the bow of the marine vessel will ride high during the acceleration. In order to provide a smooth transition to the vessel plane position, it may be desirable to gradually reduce the acceleration of the marine vessel, letting the marine vessel exceed the desired cruising speed 56, and then decelerating the marine vessel slightly to bring the speed (e.g., engine speed or vessel speed) down to the desired cruising speed 56 while the marine vessel is on plane. Allowing a user to set this overshoot value 58 allows the user to control that process. Alternatively or additionally, the system 1 may provide the ability to set the overshoot hold time 62, which dictates how quickly and smoothly the marine vessel settles into the desired cruising speed 56 after reaching the overshoot value 58. In other words, the overshoot hold time 62 is the time (such as in seconds) that it takes for the marine vessel 2 to decelerate from the peak speed 45 to the desire cruising speed 56.

As the user adjusts the ramp value 60 and/or the overshoot value 58, the graph 40 is automatically adjusted to reflect the adjusted values, which includes adjusting the acceleration illustration curve 44. Accordingly, the graph 40 continually visually correlates the set ramp value 60 and the set overshoot value 58 to the acceleration illustration curve 44. In the depicted embodiments, the current set ramp value 60 and the overshoot value 58 are displayed adjacently to the acceleration illustration curve 44. Additionally, the ramp value 60 and the overshoot value 58 are represented by an icon 51 overlaid on the acceleration illustration curve 44. More specifically, the icon 51 is acceleration illustration curve 44 where peak speed 45 is reached, and thus its value with respect to the vertical axis (the y-axis) represents the overshoot and its value with respect to the horizontal axis (the x-axis) represents the time it takes to reach the peak speed 45, and thus the aggressiveness of the acceleration. In the depicted embodiment, a straight line 50 is also displayed connecting the zero point 43 to the point on the acceleration illustration curve 44 where peak speed 45 is reached. The straight line 50 has a slope 50a which represents the aggressiveness of the acceleration, and thus further correlates the effect of the set ramp value 60 to the acceleration illustration curve 44. In other words, the higher the ramp value 60, the steeper the slope 50a of the line 50.

The overshoot value 58 is visually depicted by representing the desired cruising speed 56 on the graph in a way that the user can see, in a relative sense, how much the desired cruising speed 56 is exceeded and for approximately how long. In the depicted embodiment, the desired cruising speed 56 is represented as a horizontal line 46 across the graph 40. The overshoot value 58 is thus visually correlated to the acceleration illustration curve 44 by the vertical difference 48 between the horizontal line 46 and the peak speed 45—i.e., how far the icon is above the horizontal line 46, which in FIGS. 3 and 4 is labeled by arrow 48. Likewise, the overshoot behavior may be visually correlated to the acceleration representation on the graph 40 because the slope of the acceleration illustration curve 44 between the peak speed and the cruising speed (which may be liner or a non-linear) is adjusted to reflect the overshoot hold time 62. Thus, the overshoot hold time 62 is visually depicted by the horizontal difference 49 between the peak speed 45 and the point where the acceleration illustration curve 44 intersects the horizontal line 46 representing the desired cruising speed 56 (which is labeled by arrow 49 in FIGS. 3 and 4). Thus, the graph 40 provides an easy visual correlation for the user of how the overshoot value 58 and overshoot hold time 62 correlate to and affects the acceleration behavior of the marine vessel 2.

In addition to the user interface display 30, which displays the graph, the user interface system may include or incorporate various input means through which the user can provide control input to adjust the relevant values, including the desired cruising speed 56 (which in various embodiments may be set as an engine RPM value 56a or a vessel speed value 56b), ramp value 60, overshoot value 58, and overshoot hold time 62. For example, the input means may include a standard mouse and/or keyboard, or may be a keypad through which the user can enter the values, or a set of buttons through which the user can select values and provide "increase" and "decrease" instructions, or the like. Alternatively or additionally, the user interface system may include a user interface display 30 that is touchscreen that allows the user to provide input as touch instructions to control the relevant values. This may be accomplished via any of various adjustment means, examples of which are shown in FIGS. 4 and 5.

In other examples, user interface portion of the system 1 may include a voice input device, a motion input device for detecting non-touch gestures and other motions by a user, and other comparable input devices and associated processing elements capable of receiving input from a user. The user interface display 30 may be any visual output device, such as a video display or graphical display, that displays an interface in accordance with this disclosure of the system and method as disclosed herein, and in one embodiment is a touchscreen that combines the input device into the user interface display 30. Speakers, printers, haptic devices and other types of output devices may also be included in the user interface portion of the system 1.

The inventors further recognized that an additional beneficial feature of a user interface would be to enable simultaneous adjustment of the ramp value 60 and overshoot value 58, since these values are interrelated. Accordingly, certain embodiments of the graph 40 may include an adjustment point 52 that the user can move to simultaneously adjust the ramp value 60 and the overshoot value 58. In such an embodiment, the graph 40 may be broken into a set of cells, or regions, having horizontal and vertical coordinates (e.g. the corresponding x and y axis values). Each of the horizontal and vertical coordinates, or cells, where the adjustment point 52 could be placed on the graph 40 is associated with a ramp value 60 and overshoot value 58. Thus, as the user moves the adjustment point 52 on the screen, the ramp value 60 and overshoot value 58 are selected as those values associated with the current horizontal and vertical coordinates of the adjustment point 52. Likewise, each of the horizontal and vertical coordinates on the graph 40 may be associated with an acceleration illustration curve 44 that corresponds to the respective ramp value 60 and overshoot value 58. Accordingly, as the user moves the adjustment point 52 on the screen the acceleration illustration curve 44 corresponding to the current location— i.e., current horizontal and vertical coordinates—of the adjustment point 52 is displayed. Alternatively, the acceleration illustration curve 44 may be determined by other means, such as a set of calculated values determined based on the ramp value 60 and overshoot value 58.

Input to adjust the adjustment point 52 may be received by the user via any number of user input means, such as a mouse, trackpad, or other user guided touch input device for controlling a selection point on the user interface display. Alternatively, the user interface display 30 may be a touchscreen configured to receive touch input from the user to dictate the location of the adjustment point 52. Certain embodiments may enable the user 32 to provide touch input to move the adjustment point 52, such as by a touch and drag motion on the touchscreen at or near the current location of the adjustment point 52. The touch and drag motion to move the adjustment point 52 is exemplified as gesture 32a in FIG. 4, which may be in either the horizontal direction, vertical direction, or may have both a horizontal and vertical component. The location of the user's finger on the touchscreen is sensed and correlated to one of the horizontal and vertical coordinates on the graph 40. The ramp value 60 and overshoot value 58 associated with that location are then adjusted to be those values associated with that horizontal and vertical coordinate location. The associated acceleration illustration curve 44 is then displayed, or in certain embodiments recalculated based on the adjusted ramp and overshoot values as described above.

The user interface display 30 is continually updated with the adjusted ramp values 60, overshoot values 58, updated acceleration illustration curve 44, and adjusted line 50. Thereby, the graph 40 provides a live visual depiction that correlates the impact of the simultaneously adjusted ramp value 60 and overshoot value 58 on the acceleration behavior of the marine vessel 2. Thereby, the user is able to accurately and efficiently adjust the values, and to understand the effects that the adjustments have on the behavior of the marine vessel 2 during the potential acceleration activity.

In certain embodiments of the user interface involving a touchscreen user interface display 30, the system 1 is configured to permit adjustment of the desired cruising speed 56 by enabling a user to provide a touch and drag input to move the horizontal line 46 representing the desired cruising speed 56. For example, the user input may be along the line of the vertical axis 41, exemplified as gesture 32b in FIG. 4. Alternatively or additionally, the system may be configured to accept a touch and drag input from a user anywhere along the horizontal line 46, to move the horizontal line 46 up or down on the graph 40. Similar to the above-described control input for the adjustment point 52, the vertical coordinate of each row of cells on the graph 40 may be associated with a desired cruising speed 56. Thus, the desired cruising speed 56 is determined as that value corresponding to the location of the user's touch input moving the horizontal line 46.

In certain embodiments of the user interface involving a touchscreen user interface display 30, the system 1 is configured to permit adjustment of the overshoot hold time 62 by enabling a user to provide a touch and drag input to move adjustment point 54 where the acceleration illustration curve 44 levels out at the desired cruising speed 56. As the adjustment point 54 is moved away from the peak speed 45 point (e.g., the adjustment point 52), the slope of the acceleration illustration curve 44 between those two points becomes more gradual—i.e., the deceleration from the peak speed 45 point to the desire cruising speed 56 becomes more gradual. Conversely, as the adjustment point 54 is moved towards the peak speed 45 point, the slope of the acceleration illustration curve 44 between those two points becomes more aggressive. Similar to the description above regarding the overshoot adjustment point 52 and the cruising speed adjustment, the horizontal coordinate of the touch input on the touchscreen may be correlated with an overshoot hold time 62.

FIG. 5 depicts another embodiment of a user interface that could be provided on a touchscreen user interface display 30. The graph 40 depicted therein does not incorporate adjustment points, such as adjustment points 52 or 54 described above, but instead provides other adjustment means on the touchscreen by which a user can provide input to adjust the desired cruising speed 56, ramp value 60, overshoot value 58, and/or overshoot hold time 62. In the depicted embodiment, the adjustment means include up and down arrows that a user can touch to adjust the relevant values up or down. In other embodiments, the adjustment means may be any interactive graphical element on the user interface display 30 by which the user can adjust the respective values. Other examples include, but are not limited to, fields where the user can touch to activate a keyboard on the touchscreen user interface display 30 to input the respective values. The acceleration illustration curve is then updated to reflect any change in the respective values.

In the example, the cruising speed adjustment means are exemplified as up and down arrows 57a and 57b, representing locations on the touchscreen user interface display 30 where a user can touch to adjust the desired cruising speed 56 up or down, respectively. Likewise, ramp adjustment means are exemplified by up and down arrows 61a and 61b that adjust the ramp values 60 up or down, respectively. Likewise, the overshoot adjustment means are exemplified by arrows 59a and 59b, which can be utilized to input adjustment instructions to adjust the overshoot value 58 up or down, respectively. Likewise, up and down arrows 63a and 63b represent adjustment means for the overshoot hold time 62, which can be touched by the user to adjust the overshoot time 62 up or down respectively.

Figure 2:
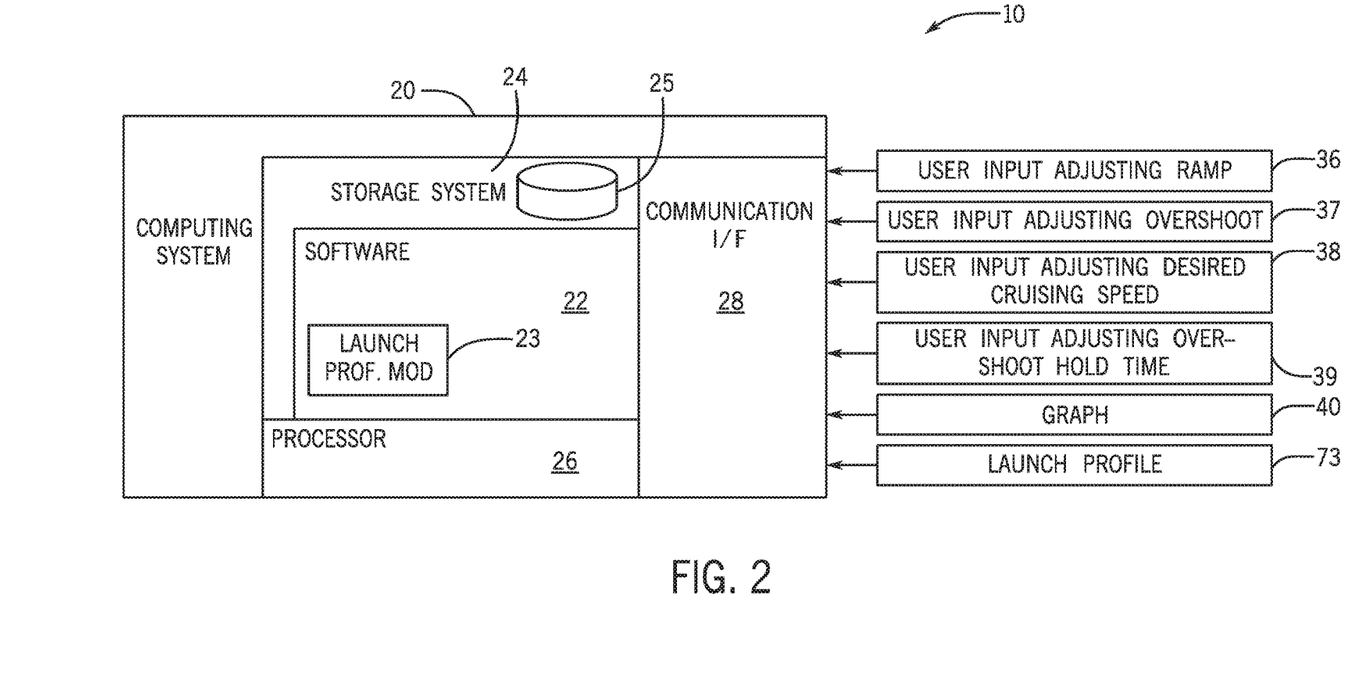
FIG. 2 is a schematic representation of an embodiment of a computing system incorporated into a system for controlling acceleration of a marine vessel.

The user interface display 30 provides input to and is controlled by computing system 20. FIG. 2 provides a system diagram of an exemplary embodiment of the computing system 20. The computing system 20 includes launch profile interface module 23, which generally comprises a set of software instructions executable on the processor 26 to carry out the methods and control the user interface display 30 as described herein. Thus, the launch profile interface module 23 receives the user inputs and provides output to display the graph 40 on the user interface display 30, such as according to the illustrations in FIGS. 3-5. The computing system 20 may be an on-board computing system installed on the marine vessel 2, such as a VesselView system by Mercury Marine of Fond Du Lac, Wis. Alternatively or additionally, the computing system 20 may be or include a remote computing device, 34, which may be any computing device capable of and configured to execute the launch profile interface module 23. For example, the remote computing device 34 may be any personal computer, smart phone, tablet, or the like having a software instruction set or software application containing the launch profile interface module 23. FIG. 1 provides just one example of such a system 1, which incorporates a remote computing device 34 communicatively connected to an on-board computing system 20. Both the remote computing system 34 and the on-board computing system 20 have stored and can access a launch profile interface module 23 whereby a user can create a launch profile 73. The remote computing device 34 communicates with the on-board computing system 20 via communication link 35, which may be by any available wired or wireless means and data transfer protocols, including wireless protocols such as Bluetooth, Near Field Communication (NFC), RFID, ANT, or the like. Accordingly, the user can utilize a remote computing device 34, such as their smartphone, to create and store launch profiles 73, which can then be shared back and forth with the on-board computing device 20. It should be understood that, in such an embodiment, numerous remote computing devices 34 may operate within the system 1 to store and communicate launch profiles 73 to the on-board computing device 20.

The computing system 20 generally includes a processor 26, storage system 24, software 22, and communication interface 28. The processor 26 loads and executes software 22 from the storage system 24, including the launch profile interface module 23, which is an application within the software 22. The launch profile interface module 23 includes computer-readable instructions that, when executed by the computing system 20 on the processor 26, direct the processing system 26 to operate as described in herein in further detail, including to execute the steps to determine the acceleration illustration curve 44 and display it on the graph 40. The launch profile interface module 23 further includes instructions that enable a user to create and save a launch profile 73, which is a record of the user-set values that can be executed to enable the computing system 20, HCM 12 and or ECM 8 to control the engine 6 to accelerate the marine vessel 2 accordingly. For example, the launch profile 73 may be the desired cruising speed 56, overshoot value 58, ramp value 60, and/or overshoot hold time 62, or may be a set of values (such as a set of engine RPMs) or other instructions calculated based on those values that could be utilized to control the engine 6.

The launch profiles 73 may be stored in a launch profile database 25 such that they are accessible by the launch profile interface module 23 and can be selected by a user for execution. For example, the launch profile interface module 23 may control the user interface display 30 to display a list of stored launch profile identifiers, allowing a user to select a particular launch profile 73 for execution. FIG. 3 provides an exemplary a selectable list of stored launch profile identifiers 66.

Although the computing system 20 as depicted in FIG. 2 includes one software 22 encapsulating one launch profile interface module 23, it should be understood that one or more software elements having one or more modules may provide the same operation. Similarly, while description as provided herein refers to a computing system 20 and a processor 26, it is to be recognized that implementations of such systems can be performed using two or more processors, which may be communicatively connected, and such implementations are considered to be within the scope of the description.

The processor 26 can comprise a microprocessor, and may also incorporate other circuitry that retrieves and executes software 22 from storage system 24. Processor 26 can be implemented within a single processing device, which may be shared or dedicated, but can also be distributed across multiple processing devices or sub-systems that cooperate in executing program instructions. Examples of processors 26 include general purpose central processing units, applications specific processors (such as comprised in an application specific integrated circuit), and logic devices, as well as any other type of processing device, combinations of processing devices, or variations thereof.

The storage system 24, which includes the launch profile database 25, can comprise any storage media, or group of storage media, readable by processor 26, and capable of storing software 22. The storage system 24 can include volatile and non-volatile, removable and non-removable media implemented in any method or technology for storage of information, such as computer-readable instructions, data structures, program modules, or other data. Storage system 24 can be implemented as a single storage device but may also be implemented across multiple storage devices or sub-systems. For example, some or all of the software 22 may be stored on a separate storage device than launch profile database 25. Likewise, launch profile database 25 can be stored, distributed, and/or implemented across one or more storage media or group of storage medias. Similarly, launch profile database 25 may encompass multiple different sub-databases at different storage locations and/or containing different information which may be stored in different formats. Storage system 24 can further include additional elements, such a controller capable of communicating with the processor 26.

Examples of storage media include random access memory, read only memory, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. Likewise, the storage media may be housed locally with the processor 26, or may be distributed in one or more servers, which may be at multiple locations and networked, such as in cloud computing applications and systems. In some implementations, the storage media can be a non-transitory storage media. In some implementations, at least a portion of the storage media may be transitory.

The communication interface 28 interfaces between the elements within the computing system 20 and external devices, such as the user interface 30 and other control elements or modules within the system 1, such as the HCM 12 and/or ECM 8. For example the communication interface 28 may transmit instructions to the user interface display 30a to display the graph 40 and may receive information from the user input element of the user interface 30 regarding adjustment of the ramp value 60, overshoot value 58, overshoot hold time 62, desired cruising speed 56, and/or other user commands relating to the creation and storage of a launch profile 73.

Figure 6:
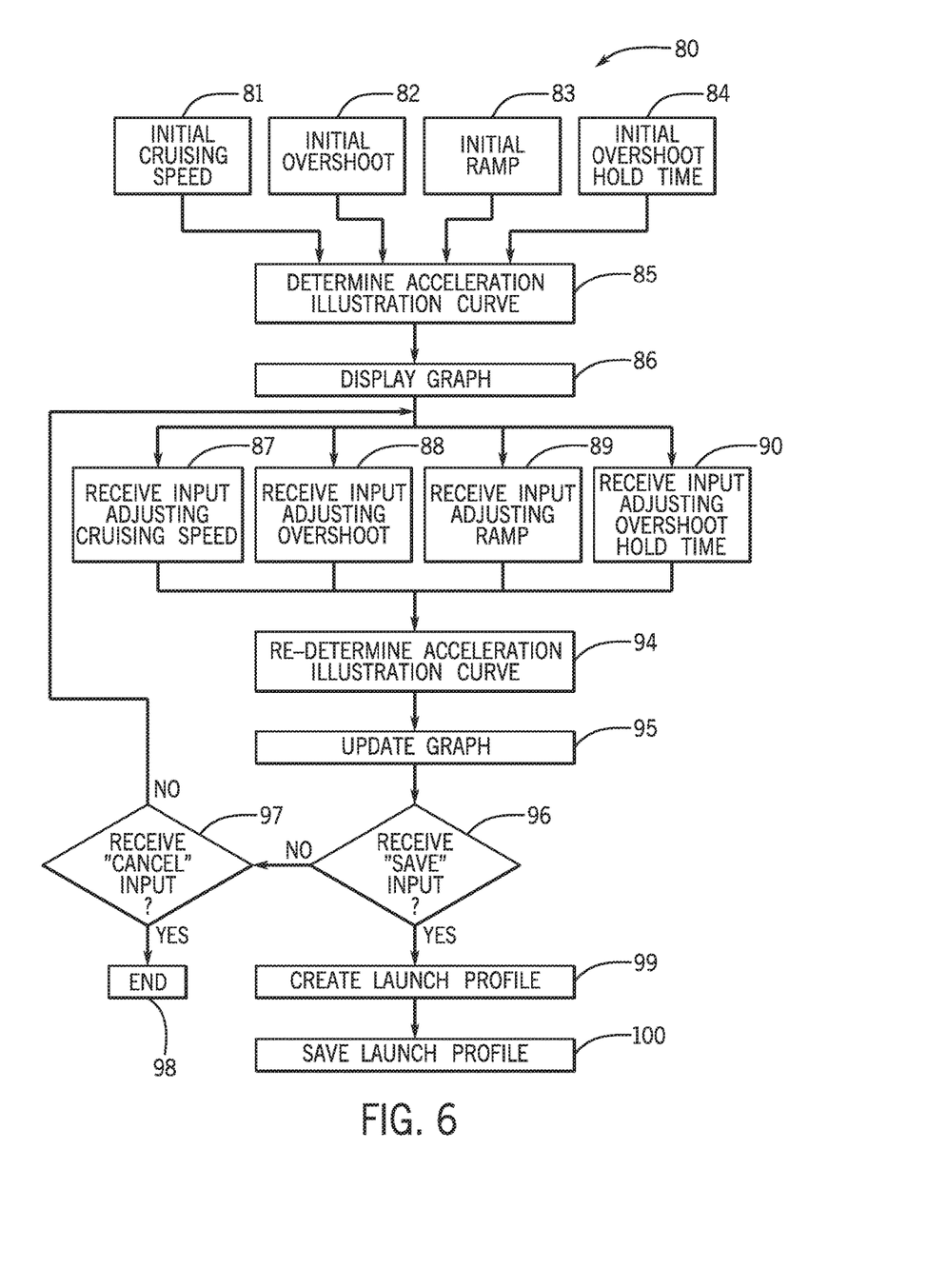
FIG. 6 is a flow chart depicting one embodiment of a method for controlling acceleration of a marine vessel.
Figure 7:
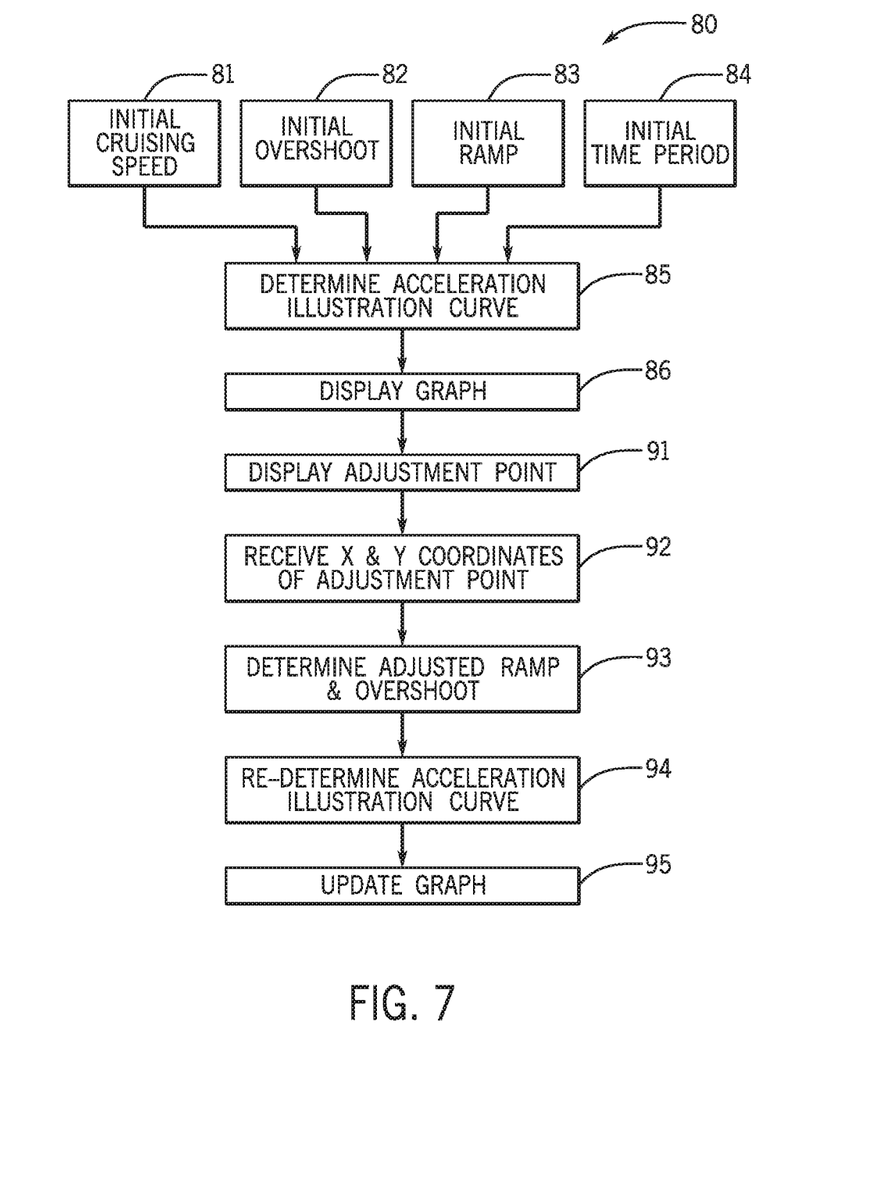
FIG. 7 is a flow chart depicting another embodiment of a method for controlling acceleration of a marine vessel

FIGS. 6 and 7 depict exemplary embodiments of methods 80, or instruction sets, that may be carried out by the launch profile interface module 23 executed on processor 26. Initial values are accessed, including an initial cruising speed at step 81, an initial overshoot value at step 82, an initial ramp value at step 83, and an initial overshoot hold time at step 84. The respective initial values may be preset default values for the display, where the launch profile interface module 23 always displays the same initial graph 40 as a default upon startup. In other embodiments, the initial values may be based on previous values, such as based on the most recently executed profile or based on the last value inputted by the user in the previous run session of the launch profile interface module 23.

At step 85, the acceleration illustration curve 44 is determined. As with the initial values, the initial acceleration illustration curve 44 may be a default set of values accessed by the launch profile interface module 23, or it may be based on a recently stored or executed launch profile. In still other embodiments, step 85 may involve calculation of the acceleration illustration curve 44 based on the initial values. The user interface display 30 is then controlled to display the graph at step 86, such as a graph 40 similar to those exemplified in FIGS. 3-5.

User input is then received to adjust one or more of the values. For example, input adjusting the cruising speed may be received at step 87, and/or input adjusting the overshoot value may be received at step 88, and/or input adjusting the ramp value may be received at step 89, and/or input adjusting the overshoot hold time may be received at step 90. The user input may be received via any user input means, various embodiments of which are exemplified and described above. The acceleration curve is then redetermined at step 94 based on the adjusted values, and the graph is updated at step 95 to display the redetermined acceleration illustration curve 44. These steps are repeatedly executed in order to update the graph 40 as adjusted values are received, and the updated graph is continually displayed until a "save" input is received at step 96 or a "cancel" input is received at step 97.

The "save" input is a user instruction to create a launch profile 73. Thus, once the "save" input is received at step 96, instructions are executed at step 99 to create a launch profile 73. For example, the "save" input received at step 96 may be, for example, a user input associated with selection of the save button 70 as shown in FIG. 3. For instance, regarding the embodiment where the user interface display 30 is a touchscreen, the "save" input may be receipt of a user touch input at the location on the touchscreen 30 associated with the save button 70. The launch profile is saved in memory at step 100, such as in the launch profile database 25 in storage system 24. As described above, the launch profile 73 is a set of values or instructions that may be executed by the computing system 20 and/or other control modules on the marine vessel 2, such as the HCM 12 and/or the ECM 8, to control the engine 6 in a way that accelerates the marine vessel 2 accordingly.

At step 97 the launch profile interface module determines whether a "cancel" input is received, such as by receipt of a user input selecting the cancel button 71 shown in the embodiment at FIG. 3. Upon receipt of a "cancel" input at step 97, the instructions relating to establishing a launch profile 73 are ended at step 98, which may include ceasing to display the graph 40, and may include exiting the launch profile interface module 23 instructions altogether.

FIG. 7 depicts another embodiment of a method 80 for controlling acceleration of a marine vessel 2. In the depicted embodiment, the initial values are accessed and the graph is displayed according to steps 81-86 as described above. Additionally, an adjustment point is displayed on the graph at step 91 based on the initial overshoot value received at step 82 and the initial ramp value received at step 83. When a user adjusts the adjustment point 52, horizontal and vertical coordinates of the adjustment point are received at step 92. Adjusted values are then determined at step 93, including adjusted ramp and overshoot values. The acceleration illustration curve is then redetermined at step 94, and the graph is updated accordingly at step 95.

For example, the launch profile interface module 23 may receive the horizontal and vertical coordinates of the user's touch input to move the adjustment point 52 on the graph 40, and then may determine an adjusted overshoot value 58 and ramp value 60 based thereon. For example, the launch profile interface module 23 may access a table containing overshoot and/or ramp values based on the horizontal and vertical coordinates. Likewise, each cell in table may contain a set of values which can be used to display the acceleration illustration curve 44 on the user interface display 30.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method for controlling acceleration of a marine vessel having at least one engine, the method comprising:
   receiving a ramp value and an overshoot value;
   determining an acceleration illustration curve based on the ramp value and the overshoot value, wherein the acceleration illustration curve visually represents engine RPM values or vessel speed values over time for accelerating the marine vessel to a desired cruising speed;
   displaying a graph containing the acceleration illustration curve on a user interface display, wherein the graph visually correlates the ramp value and the overshoot value to the acceleration illustration curve;
   receiving a user input adjusting the ramp value and/or the overshoot value;
   determining an adjusted ramp value and/or an adjusted overshoot value based on the user input;
   redetermining the acceleration illustration curve based on the adjusted ramp value and/or the adjusted overshoot value;
   updating the graph based on the redetermined acceleration illustration curve; and
   communicating a launch profile to an engine control module based on at least the adjusted ramp value and/or the adjusted overshoot value to cause acceleration of the at least one engine based on the launch profile.

2. The method of claim 1, further comprising:
   receiving a user input to save the redetermined acceleration illustration curve; and
   storing the launch profile in memory based on the adjusted ramp value and the adjusted overshoot value.

3. The method of claim 2, further comprising:
   receiving a user input to execute the launch profile; and
   accelerating the engine based on the launch profile upon receipt of the user input to execute the launch profile.

4. The method of claim 1, further comprising presenting an adjustment point on the acceleration illustration curve movable by a user to simultaneously adjust the ramp value and the overshoot value.

5. The method of claim 4, wherein the user input adjusting the ramp value and/or the overshoot value changes a horizontal coordinate and/or a vertical coordinate of the adjustment point on the graph, and wherein the adjusted ramp value and/or the adjusted overshoot value are determined based on the horizontal coordinate and the vertical coordinate of the adjustment point.

6. The method of claim 5, wherein the graph comprises a set of horizontal and vertical coordinates, wherein each horizontal and vertical coordinate in the set of horizontal and vertical coordinates is associated with a respective ramp value, a respective overshoot value, and a respective acceleration illustration curve.

7. The method of claim 5, wherein the user interface display is a touchscreen and the user input adjusting the ramp value and/or the overshoot value is a touch and drag motion at a location of the adjustment point on the touchscreen.

8. The method of claim 1, wherein the user interface display is a touchscreen, and further comprising displaying a ramp adjustment means on the touchscreen for receiving user input to adjust the ramp value and displaying an overshoot adjustment means on the touchscreen for receiving user input to adjust the overshoot value.

9. The method of claim 8, further comprising:
   receiving user input adjusting the desired cruising speed;
   determining an adjusted desired cruising speed based on the user input adjusting the desired cruising speed; and
   redetermining the acceleration illustration curve based on the adjusted desired cruising speed.

10. The method of claim 9, further comprising displaying the adjusted desired cruising speed as a horizontal line on the graph.

11. The method of claim 10, wherein the user interface display is a touchscreen, and the user input to adjust the desired cruising speed is a touch and drag motion on the touchscreen to move the horizontal line.

12. The method of claim 1, further comprising:
   receiving a user input adjusting an overshoot hold time;
   determine an adjusted overshoot hold time based on the user input adjusting an overshoot hold time; and
   redetermining the acceleration illustration curve based on the adjusted overshoot hold time.

13. A system for controlling acceleration of a marine vessel having at least one engine, the system comprising:
   a processor;
   a user interface display operatively connected to the processor;
   a launch profile interface module executable on the processor to:

determine an acceleration illustration curve based on a ramp value and an overshoot value, wherein the acceleration illustration curve visually represents engine RPM values or vessel speed values over time for accelerating the marine vessel from idle to a desired cruising speed;

display a graph containing the acceleration illustration curve on the user interface display, wherein the graph visually correlates the ramp value and the overshoot value to the acceleration illustration curve;

receive a user input to adjust the ramp value and/or the overshoot value;

determine an adjusted ramp value and/or an adjusted overshoot value based on the user input;

redetermine the acceleration illustration curve based on the adjusted ramp value and/or the adjusted overshoot value;

update the graph based on the redetermined acceleration illustration curve; and communicate a launch profile to an engine control module based on at least the adjusted ramp value and/or the adjusted overshoot value to cause acceleration of the at least one engine based on the launch profile.

14. The system of claim 13, wherein the launch profile interface module is further executable on the processor to:

receive a user input to save the redetermined acceleration illustration curve;

store the launch profile in memory based on at least the adjusted ramp value and/or the adjusted overshoot value;

receive a user input to execute the launch profile; and communicate the launch profile to the engine control module to cause acceleration of the at least one engine based on the launch profile upon receipt of the user input to execute the launch profile.

15. The system of claim 13, wherein the launch profile interface module is further executable on the processor to display an adjustment point on the acceleration illustration curve that visually correlates the ramp value and the overshoot value to the acceleration illustration curve.

16. The system of claim 15, wherein the adjustment point is movable by a user to simultaneously adjust the ramp value and the overshoot value.

17. The system of claim 16, wherein the user interface display is a touchscreen, and wherein the user input to adjust the ramp value and/or the overshoot value is a touch and drag motion to change a horizontal coordinate and/or a vertical coordinate of the adjustment point on the graph, and wherein the adjusted ramp value and the adjusted overshoot value are determined based on the horizontal coordinate and the vertical coordinate of the adjustment point.

18. The system of claim 17, wherein the launch profile interface module is further executable on the processor to prevent the user from moving the adjustment point below a vertical coordinate position associated with the desired cruising speed.

19. The system of claim 18, wherein the launch profile interface module is further executable on the processor to display a horizontal line on the graph at the vertical coordinate position associated with the desired cruising speed.

20. The system of claim 13, wherein the user interface display is a touchscreen, and wherein the launch profile interface module is further executable on the processor to display a ramp adjustment means through which it receives the user input to adjust the ramp value and an overshoot adjustment means through which it receives the user input to adjust the overshoot value.

* * * * *